(12) United States Patent
Makio et al.

(10) Patent No.: US 7,897,709 B2
(45) Date of Patent: Mar. 1, 2011

(54) SINGLE CHAIN-END FUNCTIONALIZED POLYOLEFIN

(75) Inventors: Haruyuki Makio, Sodegaura (JP); Terunori Fujita, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 94 days.

(21) Appl. No.: 12/468,303

(22) Filed: May 19, 2009

(65) Prior Publication Data

US 2009/0281260 A1 Nov. 12, 2009

Related U.S. Application Data

(62) Division of application No. 10/569,604, filed as application No. PCT/JP2004/012791 on Aug. 27, 2004, now abandoned.

(30) Foreign Application Priority Data

Aug. 27, 2003 (JP) .............................. 2003-302240

(51) Int. Cl.
*C08F 4/62* (2006.01)
*C08F 4/622* (2006.01)
*C08F 4/64* (2006.01)
*B01J 31/22* (2006.01)

(52) U.S. Cl. ................... 526/310; 526/160; 526/161; 526/165; 526/172; 526/348; 526/351

(58) Field of Classification Search ................. 526/160, 526/161, 165, 172, 310, 348, 351
See application file for complete search history.

(56) References Cited

U.S. PATENT DOCUMENTS

| | | | |
|---|---|---|---|
| 5,502,114 | A | 3/1996 | Murakami et al. |
| 5,939,495 | A | 8/1999 | Kioka et al. |
| 6,133,209 | A | 10/2000 | Rath et al. |
| 6,479,600 | B2 | 11/2002 | Chung et al. |
| 6,787,617 | B1 | 9/2004 | Soga et al. |
| 2001/0041779 | A1 | 11/2001 | Shin et al. |
| 2003/0027955 | A1 | 2/2003 | Ishii et al. |
| 2005/0124771 | A1 | 6/2005 | Fujita et al. |

FOREIGN PATENT DOCUMENTS

| | | |
|---|---|---|
| EP | 0 529 102 A1 | 3/1993 |
| EP | 1 270 647 A1 | 1/2003 |
| JP | 6-122710 A | 5/1994 |
| JP | 6-128322 A | 5/1994 |
| JP | 6-157643 A | 6/1994 |
| JP | 6-329721 A | 11/1994 |
| JP | 6-329722 A | 11/1994 |
| JP | 7-2928 A | 1/1995 |
| JP | 7-118122 A | 5/1995 |
| JP | 8-109218 A | 4/1996 |
| JP | 11-315109 A | 11/1999 |
| JP | 2001-26614 A1 | 1/2001 |
| JP | 2001-81123 A | 3/2001 |
| JP | 2001-503464 A1 | 3/2001 |
| JP | 2003-040953 A | 2/2003 |
| JP | 2003-73412 A | 3/2003 |
| WO | WO-98/20053 A1 | 5/1998 |

OTHER PUBLICATIONS

Tadanao Kohara, Syntheses and Applications of Terminally Functionalized Polyolefins, Polymer, vol. 47, No. 2, pp. 74-77, 1998.
Doi et al., Malcromol. Chem., vol. 188, pp. 1273-1279 (1987) XP-002470912.
Makio et al., Macromolecular Rapid Communication, vol. 28, pp. 698-703 (2007) XP-002470913.
Japanese Office Action for Application No. 2004-247319 dated Jul. 6, 2010.

*Primary Examiner*—Caixia Lu
(74) *Attorney, Agent, or Firm*—Birch, Stewart, Kolasch & Birch, LLP

(57) ABSTRACT

A single-chain-end functionalized polyolefin and method of producing the same. The polyolefin is represented by the following general formula (I):

$$P-X \qquad (I)$$

wherein X is a group containing at least one element selected from oxygen, sulfur, nitrogen, phosphorus and halogens, P represents a polymer chain made mainly of an olefin composed only of carbon and hydrogen atoms, and X is bonded to a terminal of P, wherein the molecular weight distribution (Mw/Mn) obtained by gel permeation chromatography (GPC) is from 1.0 to 1.5.

3 Claims, No Drawings

SINGLE CHAIN-END FUNCTIONALIZED POLYOLEFIN

This application is a Divisional Application of application Ser. No. 10/569,604 filed on Feb. 24, 2006 now abandoned, and for which priority is claimed under 35 U.S.C. §120 and which claims the priority of PCT/JP2004/012791, filed on Aug. 27, 2004. This application also claims priority of Application No. 2003-302240, filed in Japan on Aug. 27, 2003, under 35 U.S.C. §119. The entire contents of all references are hereby incorporated by reference.

FIELD OF THE INVENTION

The present invention relates to a novel single-chain-end functionalized polyolefin.

BACKGROUND OF THE INVENTION

Polyolefins such as polyethylene (PE) and polypropylene (PP) are light and inexpensive and further have characteristics of having excellent physical properties and workability. On the other hand, high chemical stability of polyolefins is an obstacle for giving, thereto, high functionalities, typical examples of which include printability, paintability, heat resistance and impact resistance, and a function for improving compatibility thereof with other polar polymers. There are known methods for making up for such drawbacks and causing polyolefins to have functionalities. Examples thereof include a method of polymerizing an olefin with a polar monomer such as vinyl acetate or a methacrylic acid ester by radical polymerization; and a method of grafting a polar monomer such as maleic anhydride to a polyolefin in the presence of a peroxide. However, according to these methods, it is generally difficult to control minutely the structure of olefin chain moieties in the resultant polymers. As a result, excellent, original physical properties of polyolefin may be damaged.

In general, it is well known that a process using living polymerization is useful as a process for producing such a polymer. In the case of highly-controlled living polymerization, a growing terminal of the polymer quantitatively keeps reactivity. It is therefore known that the reactivity is used to cause the terminal to react directly with a polar-group-containing monomer, whereby a polymer having a functional group at its terminal position can be effectively produced.

However, in the case of polymerizing any olefin by living polymerization, chain transfer reaction of the growing polymer chain is frequently caused under ordinary conditions; therefore, it is very difficult to produce an olefin polymer by living polymerization. Some examples wherein an α-olefin is subjected to living polymerization have been reported so far. However, in any one of the report examples, the polymerization is conducted at a very low temperature in order to control chain transfer reaction. The polymerization activity thereof is also a low value. The molecular weight thereof is also at most several tens of thousands. Furthermore, monomers that can be polymerized are restricted in many cases. It is particularly difficult to produce industrially important ethylene-based (co) polymers or block copolymers. Concerning stereoregular polymerizations of α-olefins, living polymerizations exhibiting a high regularity are hardly known (see, for example, "Kobunshi", 1988, 47(2), 74-77).

Under such situations, the Applicant already discloses a transition metal compound having a salicylaldimine ligand as a novel catalyst for olefin polymerization (see Japanese Patent Application Laid-Open No. 11-315109), and further suggests a process of using the transition metal compound to produce a novel single-terminal vinyl-group-containing copolymer or a novel polar-group-containing block copolymer (see Japanese Patent Application Laid-Open Nos. 2003-73412 and 2003-40953). However, the two published documents neither disclose any polymer having a polar functional group only at its single terminal (single-chain-end functionalized polymer) nor any process for the production thereof. The present Applicant has eagerly searched a single-chain-end functionalized polymer which can be used for various purposes and has overcome the above-mentioned problems, and has then made the present invention.

SUMMARY OF THE INVENTION

Accordingly, the present invention relates to a polyolefin which has a polar functional group at its single-terminal position and is useful for various purposes.

The single-chain-end functionalized polyolefin (F) of the present invention is represented by the following general formula (I):

$$P\text{—}X \tag{I}$$

wherein X is a group containing at least one element selected from oxygen, sulfur, nitrogen, phosphorus and halogens, P represents a polymer chain made mainly of an olefin composed only of carbon and hydrogen atoms, and X is bonded to a terminal of P, wherein the molecular weight distribution (Mw/Mn) obtained by gel permeation chromatography (GPC) is from 1.0 to 1.5.

A preferred embodiment of the polymer chain (P) is a polymer chain made of units of at least one olefin selected from ethylene and olefins having 3 to 20 carbon atoms.

The invention also relates to the single-chain-end functionalized polyolefin (F) produced by a specific production process. Specifically, the single-chain-end functionalized polyolefin of the invention comprises a single-chain-end functionalized polyolefin obtained by: performing the following steps 1 and 2 in the presence of an olefin polymerizing catalyst containing a compound (A) which contains a transition metal in the groups IV to V; and subsequently performing the following step 3 if necessary:

[step 1] the step of bringing it into contact with a polar-group-containing olefin (C) represented by the following general formula (II):

$$CHA\text{=}C(R)\text{-}Q\text{-}Y' \tag{II}$$

wherein Y' is a group containing at least one element from oxygen, sulfur, nitrogen, phosphorus and halogens, Q is an alkylene group which may have a substituent, a carbonyl group, or bivalent oxygen, A and R each represent a hydrogen atom or a hydrocarbon group which may have a substituent, and A or R may be bonded together to Q to form a ring,

[step 2] the step of bringing the resultant into contact with at least one olefin (D) selected from ethylene and olefins having 3 to 20 carbon atoms n times wherein n is an integer of 1 or more, so as to mix them (provided that when n is an integer of 2 or more, the olefins (D) used in the respective contact operations are different in kind or composition), and

[step 3] the step of chemical conversion.

DETAILED DESCRIPTION OF THE INVENTION

The following will describe the single-chain-end functionalized polyolefin of the present invention, and the single-chain-end functionalized polyolefin produced by a specific production process in detail.

Single-Chain-End Functionalized Polyolefin

The single-chain-end functionalized polyolefin (F) of the invention is represented by the following general formula (I)

P—X                                                          (I)

In the formula (I), X is a group containing at least one element selected from oxygen, sulfur, nitrogen, phosphorus and halogens, that is, a polar functional group. Specific examples thereof include an oxy group; a peroxy group; a hydroxyl group; a hydroperoxy group; alkoxy groups such as methoxy, ethoxy, propoxy and butoxy; aryloxy groups such as phenoxy, methylphenoxy, dimethylphenoxy, and naphthoxy; arylalkoxy groups such as phenylmethoxy, and phenylethoxy; an acetoxy group; a carbonyl group; groups wherein an element in the group XIII or XIV is bonded to an oxygen, such as silyloxy, boryloxy, and aluminoxy; an amino group; N-mono-substituted amino groups such as methylamino, N-benzylamino, and N-cyclohexylamino; N,N-disubstituted alkylamino groups such as dimethylamino, diethylamino, dipropylamino, dibutylamino, dicyclohexylamino, dibenzylamino, piperidino, and morpholino; arylamino or alkylarylamino groups such as phenylamino, diphenylamino, ditolylamino, dinaphthylamino, and methylphenylamino; N,N-disilyl-substituted amino groups such as N,N-bis(trimethylsilyl)amino, N,N-bis(triethylsilyl) amino, and N,N-bis(t-butyldimethylsilyl)amino; other nitrogen-containing groups such as imine, amide, imide, ammonium, nitrile and sulfonamide; sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate, and pentafluorobenzenesulfonate; sulfinate groups such as methylsulfinate, phenylsulfinate, benzylsulfinate, p-toluensulfinate, trimethylbenzenesulfinate, and pentafluorobenzenesulfinate; alkylthio groups; arylthio groups; a sulfate group; a sulfide group; a polysufide group; and a thiolate group. Examples of the phosphorus-containing group include phosphines such as phenylphosphino, methylphosphino, ethylphosphino, diphenylphosphino, dimethylphosphino, diethylphosphino, methylphenylphosphino, and dibenzylphosphino; phosphine oxides; phosphine sulfides; and phosphinous acids. Examples of the halogens include fluorine, chlorine, bromine, and iodine. P represents a polymer chain made mainly of an olefin composed only of carbon and hydrogen atoms. Of such olefin polymer chains, preferred is a polyolefin polymer chain made of structural units derived from at least one selected from ethylene and olefins having 3 to 10 carbon atoms. In the formula (I), X is bonded to a terminal of P.

The molecular weight distribution (Mw/Mn) of the single-chain-end functionalized polyolefin of the invention represented by the general formula (I), the distribution being obtained by gel permeation chromatography (GPC), is from 1.0 to 1.5. However, when the single-chain-end functionalized polyolefin of the invention is produced by adopting a production process (n=1 in the step 2) which will be described later, the molecular weight distribution (Mw/Mn) is usually 1.2 or less.

When the polymer chain (P) is a polyethylene chain, that is, a chain wherein the concentration of a skeleton originating from ethylene is 80% or more by mol, the weight-average molecular weight (Mw) of the single-chain-end functionalized polyolefin of the invention is 5,000 or more, preferably 7,000 or more.

In the case that the polymer chain P in the single-chain-end functionalized polyolefin (F) of the invention contains an α-olefin chain having 3 to 20 carbon atoms, the α-olefin chain has a feature of exhibiting syndiotacticity. The fact that the α-olefin chain is syndiotactic can be identified by various spectral analyses. The following will describe the fact that the polymer chain (P) of the single-chain-end functionalized polyolefin in the invention is syndiotactic on the basis of analytic findings, giving a case in which the α-olefin is propylene as an example.

The $^{13}C$ NMR spectrum of polypropylene is measured, and attention is paid to a range of methyl groups of side chains (19.5-21.7 ppm). The syndiotacticity [rr] of a triad can be obtained by substituting an integrated value of plural peaks (19.5-20.2 ppm) corresponding to an rr triad in this range and an integrated value of peaks (20.2-21.7 ppm) corresponding to a different mm or mr triad for $I(rr)/\{I(rr)+I(mr)+I(mm)\}$ wherein I represents the integrated intensity of each chain in the $^{13}C$ NMR. In the case that polypropylene has no regularity, a statistically-random distribution is generated; therefore, values close to the following are obtained: $I(rr):I(mr):I(mm)=1:2:1$ and $[rr]=0.25$. In the single-chain-end functionalized polyolefin of the invention, the [rr] can be controlled into any value from 0.25 to 1.0 by catalytic structure or other polymerizing conditions. In the case that the regularity is particularly high ($[rr]>0.80$), a sharp peak (20.0-20.1 ppm) corresponding to an rrrr pentad makes its appearance at a higher intensity than peaks resulting from other chains. Accordingly, the syndiotacticity can be more precisely evaluated by the [rrrr]. In a copolymer made from ethylene and propylene also, syndiotacticity is kept when chains of propylene are present therein. In this case, the value of the [rr] can be obtained from a value obtained by amending overlap of methyl groups which originates from chains of EPE and EPP wherein E and P represent an ethylene unit and a propylene unit, respectively, in each polymer.

Out of single-chain-end functionalized polyolefins (F), preferred are polyolefins wherein X is an oxygen-containing group or nitrogen-containing group or is the two groups from the viewpoint of exhibiting high reactivity with various chemical species.

Single-Chain-End Functionalized Polyolefin Produced by a Specific Production Process The single-chain-end functionalized polyolefin of the invention can be effectively obtained by carrying out steps which will be detailed below successively in the presence of an olefin polymerizing catalyst containing a compound (A) which contains a transition metal in the groups IV to V in the periodic table.

As the group IV to V transition metal containing compound (A), transition metal compounds described in the above-mentioned Japanese Patent Application Laid-Open No. 2003-40953, which was filed by the Applicant, can be used without any limitation. Of these transition metal compounds, preferred transition metal compounds are illustrated below.

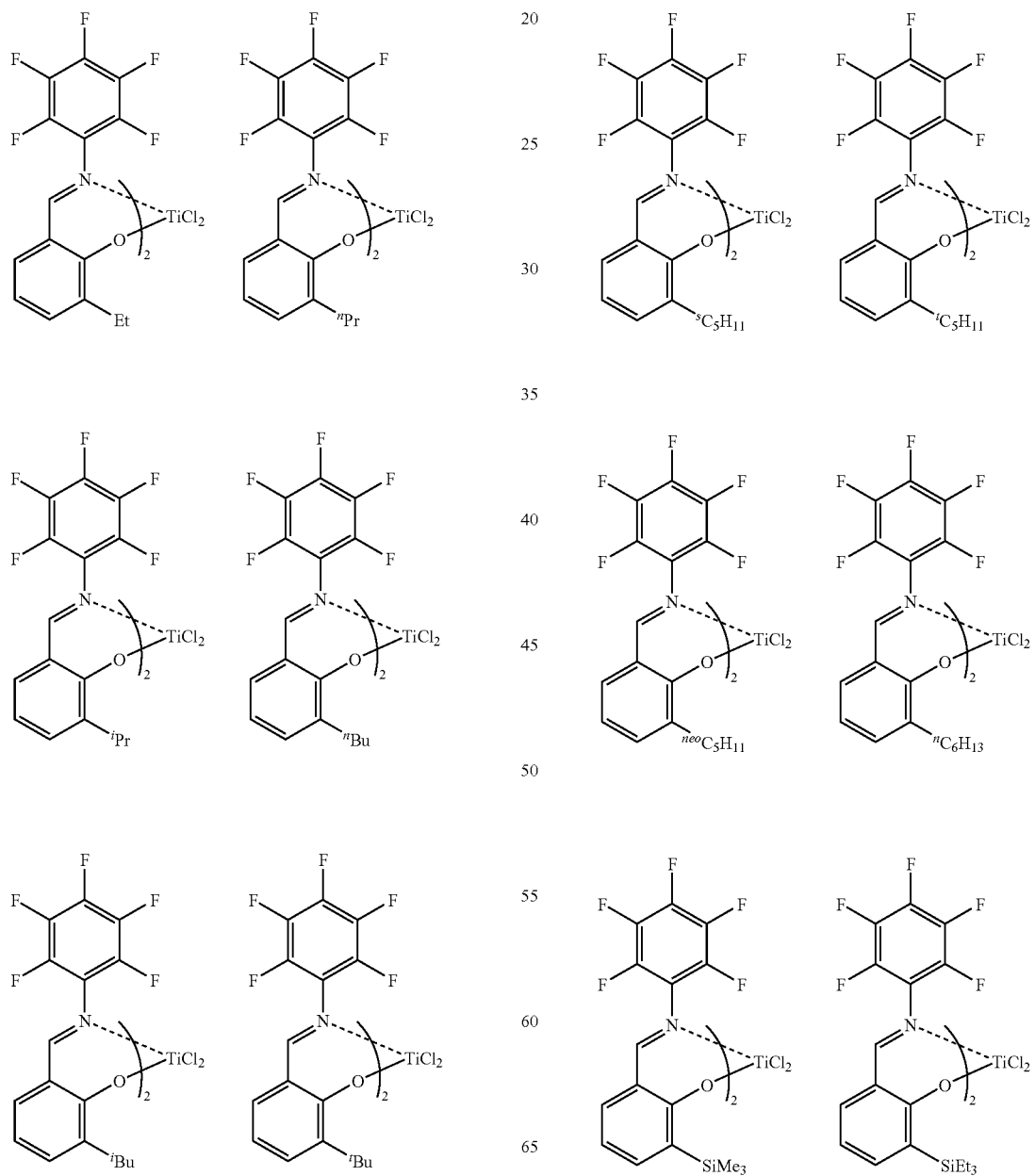

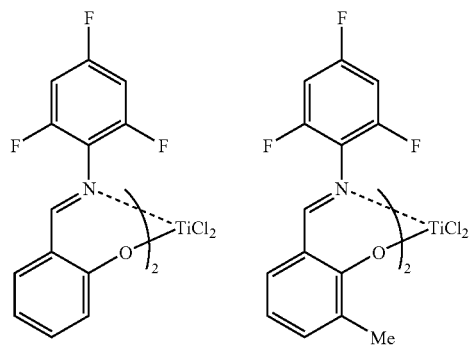
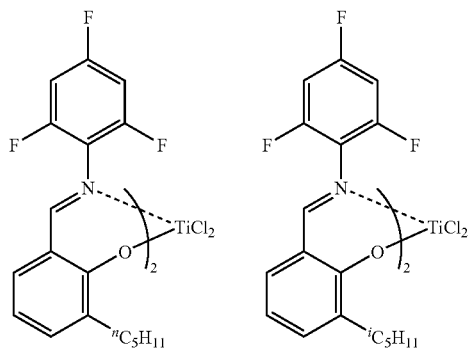
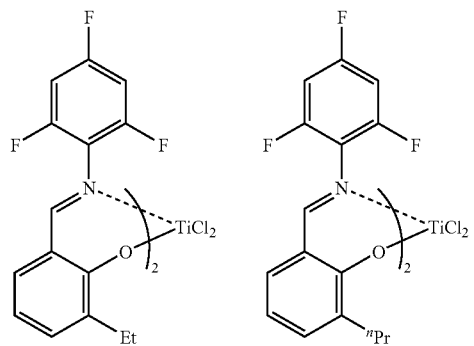
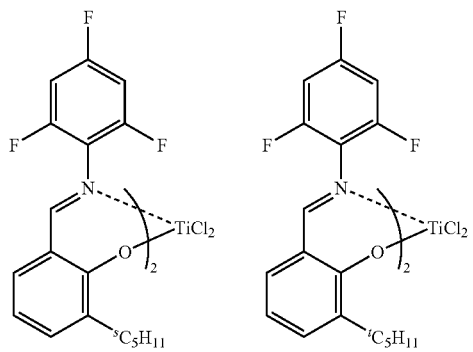
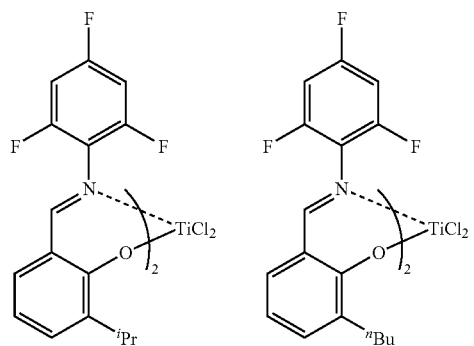
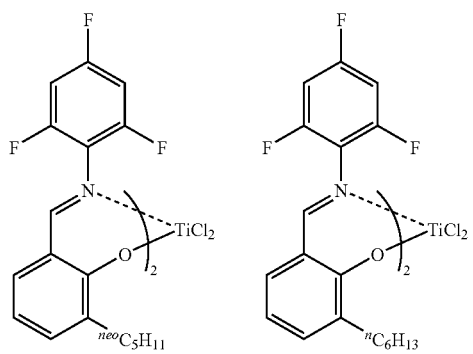
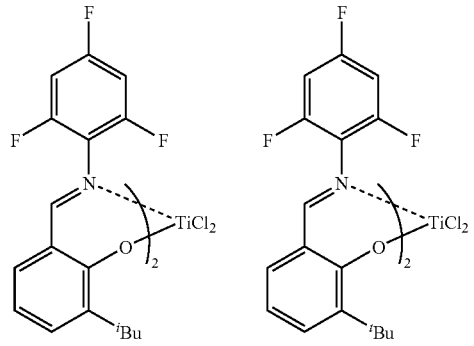
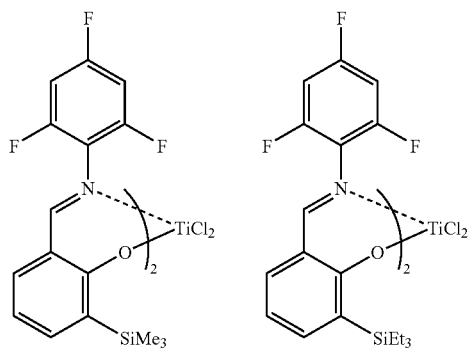

-continued
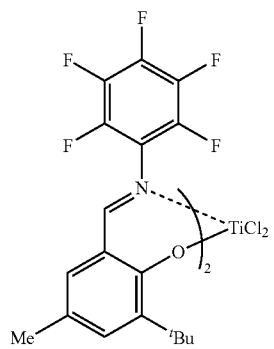
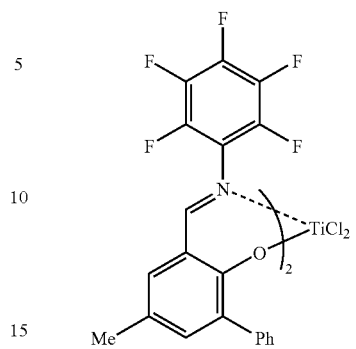
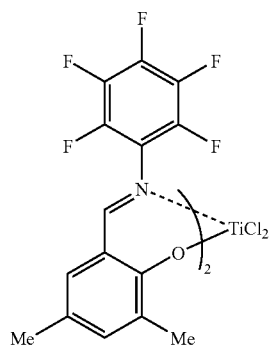
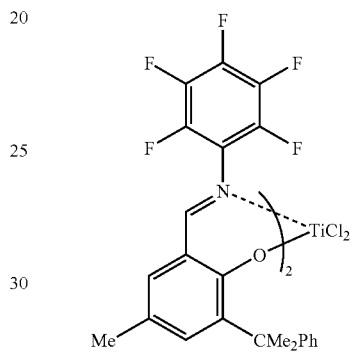
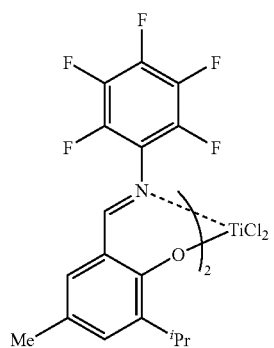
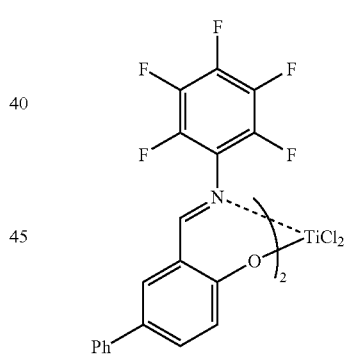
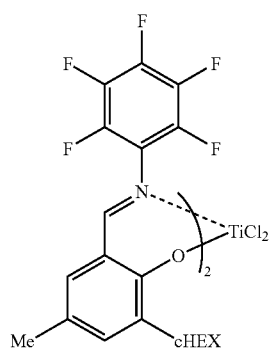
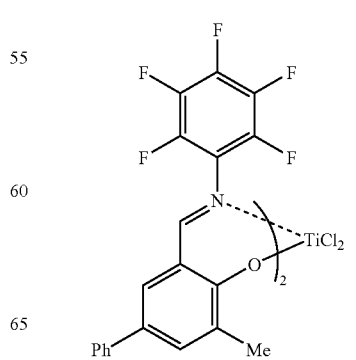

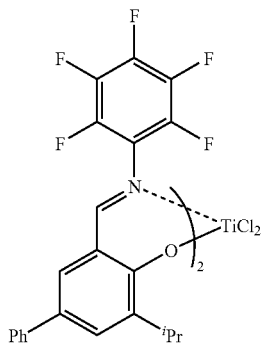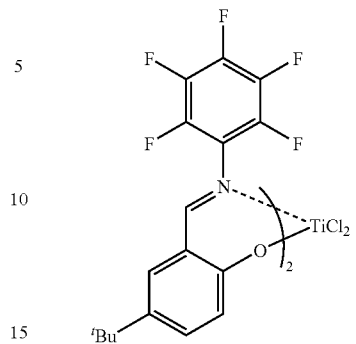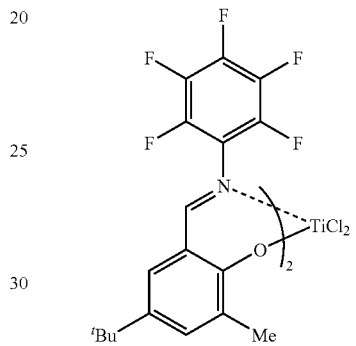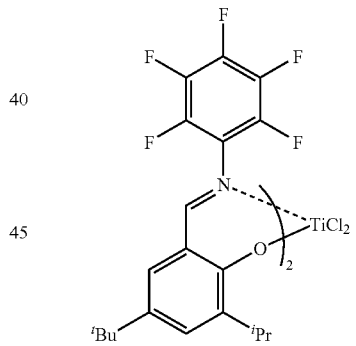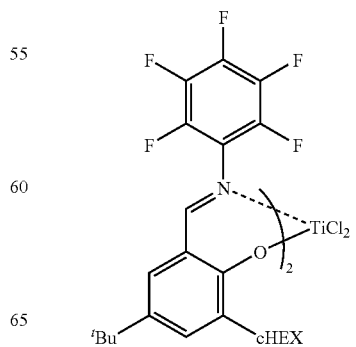

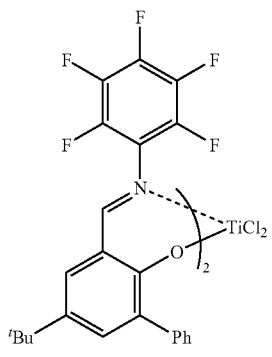
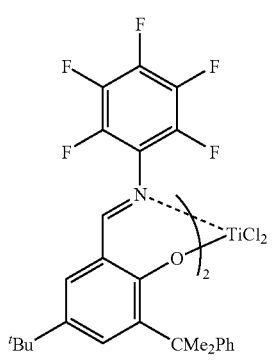
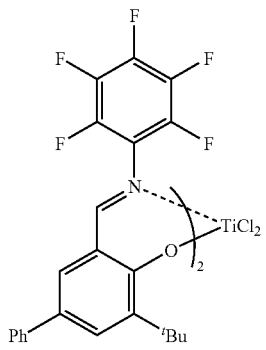
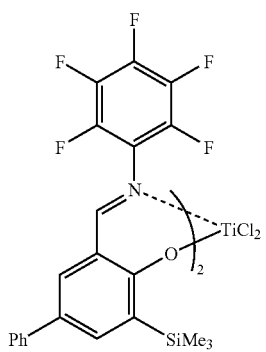
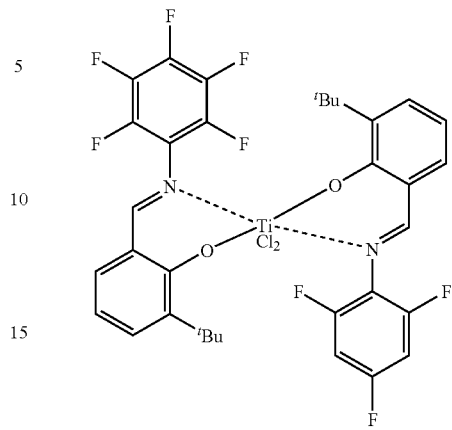
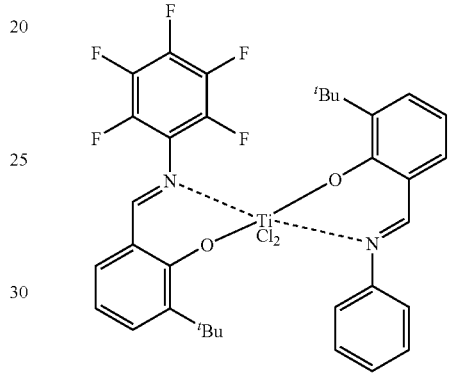
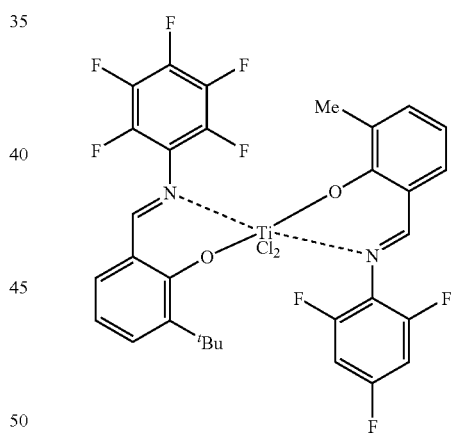
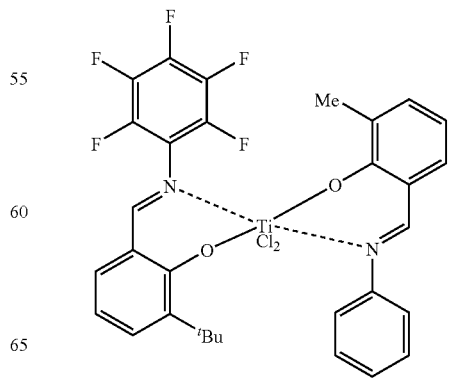

-continued

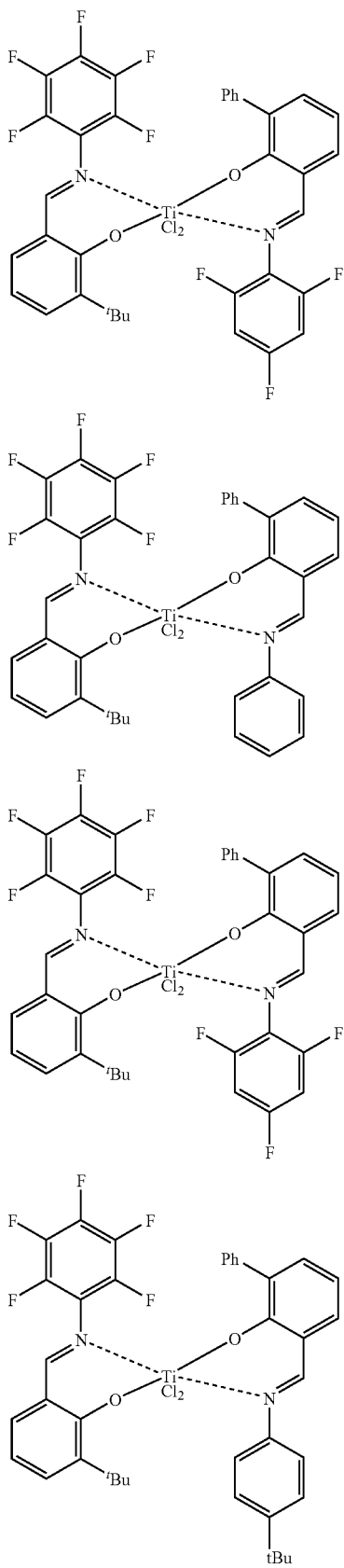

In the production process according to the invention, an organic aluminum oxy compound (B) can be used together with the group IV to V transition metal containing compound (A). The organic aluminum oxy compound (B) may be an aluminoxane known in the prior art, or an organic aluminum oxy compound insoluble in benzene, as exemplified in Japanese Patent Application Laid-Open No. 2-78687.

The known aluminoxane can be produced by, for example, a process as described below, and is usually obtained as a solution containing a solvent of a hydrocarbon.

(1) A process of adding an organic aluminum compound, such as trialkylaluminum, to a suspension of a compound containing absorbed water or a salt containing crystal water, such as magnesium chloride hydrate, copper sulfate hydrate, aluminum sulfate hydrate, nickel sulfate hydrate or cerium (I) chloride hydrate, in a hydrocarbon medium, so as to cause the absorbed water or crystal water to react with the organic aluminum compound.

(2) A process of causing water, ice or water vapor to act directly on an organic aluminum compound, such as trialkylaluminum, in a solvent such as benzene, toluene, ethyl ether or tetrahydrofuran.

(3) A process of causing an organic tin oxide such as dimethyltin oxide or dibutyltin oxide to react with an organic aluminum compound, such as trialkylaluminum, in a solvent such as decane, benzene or toluene.

Specific examples of the organic aluminum compound used when the aluminoxane is prepared include tri-n-alkylaluminums such as trimethylaluminum, triethylaluminum, tri-n-butylaluminum, tripropylaluminum, tripentylaluminum, trihexylaluminum, and trioctylaluminum; branched-trialkyl aluminums such as triisopropylaluminum, triisobutylaluminum, tri-sec-butylaluminum, and tri-2-ethylhexylaluminum; tricycloalkylaluminums such as tricyclohexylaluminum, and tricyclooctylaluminum; triarylaluminums such as triphenylaluminum, and tritolylaluminum; and trialkenylaluminums such as triisoprenylaluminum represented by $(i\text{-}C_4H_9)_x Al_y (C_5H_{10})_z$ wherein x, y and z are each a positive number and $z \geq 2x$. Of these, trialkylaluminums and tricycloalkylaluminums are preferred and trimethylaluminum is particularly preferred. The above-mentioned organic aluminum compounds may be used alone or in combination of two or more thereof.

In the production process according to the invention, at least one selected from the following can be caused to be present together with the group IV to V transition metal containing compound (A) and the organic aluminum oxy compound (B): an organic metal compound, a compound which can react with the transition metal compound (A) to form an ion pair, a carrier, and an organic compound. About the four components used if necessary, ones described in the Japanese Patent Application Laid-Open No. 2003-40953 can be used without any limitation.

The single-chain-end functionalized polyolefin (F) of the invention is obtained by performing the following steps 1 and 2 in any order in the presence of an olefin polymerizing catalyst containing a compound (A) which contains a transition metal in the groups IV to V, and subsequently performing the following step 3 if necessary; that is, the single-chain-end functionalized polyolefin (F) of the invention is obtained [i] by carrying out the steps 1 and 2 in this order, and carrying out the step 3 if necessary; or [ii] by carrying out the step 2 and step 1 in this order, and carrying out the step 3 if necessary:

[step 1] the step of bringing it into contact with a polar-group-containing olefin (C) represented by the following general formula (II):

$$CHA=C(R)-Q-Y' \qquad (II)$$

wherein Y' is a group containing at least one element from oxygen, sulfur, nitrogen, phosphorus and halogens, Q is an alkylene group which may have a substituent, a carbonyl group, or bivalent oxygen, A and R each represent a hydrogen atom or a hydrocarbon group which may have a substituent, and A or R may be bonded together to Q to form a ring,

[step 2] the step of bringing the resultant into contact with at least one olefin (D) selected from ethylene and olefins having 3 to 20 carbon atoms n times wherein n is an integer of 1 or more, so as to mix them (provided that when n is an integer of 2 or more, the olefins (D) used in the respective contact operations are different in kind or composition), and

[step 3] the step of chemical conversion

Y' in the general formula (II) used in the step 1 is a group containing at least one element from oxygen, sulfur, nitrogen, phosphorus and halogens. Examples of such a group include an oxy group; a peroxy group; a hydroxyl group; a hydroperoxy group; alkoxy groups such as methoxy, ethoxy, propoxy and butoxy; aryloxy groups such as phenoxy, methylphenoxy, dimethylphenoxy, and naphthoxy; arylalkoxy groups such as phenylmethoxy, and phenylethoxy; an acetoxy group; a carbonyl group; groups wherein an element in the group XIII or XIV is bonded to an oxygen, such as silyloxy, boryloxy, and aluminoxy; an amino group; N-monosubstituted amino groups such as methylamino, N-benzylamino, and N-cyclohexylamino; N,N-di-substituted alkylamino groups such as dimethylamino, diethylamino, dipropylamino, dibutylamino, dicyclohexylamino, dibenzylamino, piperidino, and morpholino; arylamino or alkylarylamino groups such as phenylamino, diphenylamino, ditolylamino, dinaphthylamino, and methylphenylamino; N,N-disilyl-substituted amino groups such as N,N-bis(trimethylsilyl)amino, N,N-bis(triethylsilyl)amino, and N,N-bis(t-butyldimethylsilyl)amino; nitrogen-containing groups such as imine, amide, imide, ammonium, nitrile and sulfonamide; sulfonate groups such as methylsulfonate, trifluoromethanesulfonate, phenylsulfonate, benzylsulfonate, p-toluenesulfonate, trimethylbenzenesulfonate, triisobutylbenzenesulfonate, p-chlorobenzenesulfonate, and pentafluorobenzenesulfonate; sulfinate groups such as methylsulfinate, phenylsulfinate, benzylsulfinate, p-toluensulfinate, trimethylbenzenesulfinate, and pentafluorobenzenesulfinate; alkylthio groups; arylthio groups; a sulfate group; a sulfide group; a polysufide group; and a thiolate group. Examples of the phosphorus-containing group include phosphines such as phenylphosphino, methylphosphino, ethylphosphino, diphenylphosphino, dimethylphosphino, diethylphosphino, methylphenylphosphino, and dibenzylphosphino; phosphine oxides; phosphine sulfides; and phosphinous acids. Examples of the halogens include fluorine, chlorine, bromine, and iodine. Of these, preferred are silyloxy, aluminoxy, boryloxy, and N,N-disiyl-substituted amino groups, which do not poison the catalyst easily and which generate active hydrogen in the case that hydrolysis is performed after the end of the step 2.

In the general formula (II), Q is an alkylene group which may have a substituent, a carbonyl group, or bivalent oxygen. Q is usually an alkylene group which may have a substituent wherein the total number of carbon atoms is from 1 to 20. Of alkylene groups having such a requirement, an unsubstituted linear alkylene group represented by the following formula (III) is preferably used:

$$-[CH_2]n- \qquad (III)$$

wherein n is a positive integer of 1 to 15.

In the general formula (II), A and R each represent a hydrogen atom or a hydrocarbon group which may have a substituent, and A or R may be bonded together to Q to form a ring. Of structures satisfying such requirements, a cycloolefin represented by the following formula (IV) or (IV') is preferably used:

wherein p represents an integer of 1 to 10, and is bonded to Y at any position, q is an integer of 0 to 10, and when q is 0, the cycloolefin is a monocycloolefin.

Examples of the olefin having 3 to 20 carbon atoms, used in the step 2, include linear or branched α-olefins having 3 to 20 carbon atoms, such as propylene, 1-butene, 2-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, and 1-eicocene; and cyclic olefins having 3 to 20 carbon atoms, such as cyclopentene, cycloheptene, norbornene, 5-methyl-2-norbornene, tetracyclododecene, and 2-methyl 1,4,5,8-dimethano-1,2,3,4,4a,5,8,8a-octahydronaphthalene. Other examples of the olefin having 3 to 20 carbon atoms include vinylcyclohexane, dienes and polyenes. Additional examples of the olefin include such as aromatic vinyl compounds styrene, o-methylstyrene, m-methylstyrene, p-methylstyrene, o,p-dimethylstyrene, o-ethylstyrene, m-ethylstyrene, and p-ethylstyrene, and other mono- or poly-alkylstyrenes; and 3-phenylpropylene, 4-phenylbutene, and α-methylstyrene. These olefins may each contain in the molecule thereof a heteroatom such as an oxygen, nitrogen, or silicon atom. The olefins may be used alone or in combination of two or more thereof.

In the case that n is set to 2 in the [step 2] in the production of the single-chain-end functionalized polyolefin (F) and then olefins (D) used in the first and second contacts in this production are made different from each other in kind or composition, the polymer chain (P) in the single-chain-end functionalized polyolefin (F) represented by the general formula (I) can be rendered a block type chain composed of two kinds of olefin chains each having a controlled molecular weight (the wording "different in kind or composition" in the step 2 related to the invention means the following: "different in kind"; "different in composition"; and further "different in kind and composition"). For example, in the case that after the step 1 is carried out the olefin (D) used in the first olefin-contact in the step 2 is ethylene and the olefin (D) used in the second step 2 is propylene, the resultant single-chain-end functionalized polyolefin is a single-chain-end functionalized block polymer represented by the following general formula (V):

X—PE-PP                                                                (V)

wherein X has the same meanings as in the formula (I), and PE and PP represent a polyethylene chain and a polypropylene chain, respectively.

In the case that after the step 1 is carried out the olefin (D) used in the first olefin-contact in the step 2 is ethylene and the olefin (D) used in the second step 2 is ethylene and propylene, the resultant single-chain-end functionalized polyolefin is a single-chain-end functionalized block polymer represented by the following formula (VI):

X—PE-EPR                                                              (VI)

wherein X has the same meanings as in the formula (I), and PE and EPR represent a polyethylene chain and an ethylene/propylene copolymer chain, respectively.

The step 3, which may be performed if necessary, is a step for converting the group (Y') in the general formula (II) to a different group by a reaction such as hydrolysis, oxidization, reduction, or nucleophilic substitution. For example, in Example 1 in the present specification, hydrolysis reaction is used to convert a Y' group: $Me_2Al$—O— to a different group (hydroxyl group). However, the conversion is not limited to this chemical conversion.

In the invention, the polymerization can be carried out by any one of liquid-phase polymerizations, such as dissolution polymerization, suspension polymerization, and gas-phase polymerizations.

Specific examples of an inert hydrocarbon medium used in the liquid-phase polymerization include aliphatic hydrocarbons such as propane, butane, pentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethylene chloride, chlorobenzene, and dichloromethane; and mixtures thereof. The olefin itself can be used as the solvent.

When the single-chain-end functionalized polyolefin according to the invention is produced in the presence of the above-mentioned catalyst, the operations composed of the steps 1 and 2 are usually carried out without isolating any product in each of the steps. Usually, the catalyst is once charged when the initial step 1 is started. The group IV to V transition metal compound (A) is used in an amount ranging usually from $10^{-12}$ to 1 mole, preferably from $10^{-10}$ to $10^{-1}$ mole per liter of the reaction volume. The organic aluminum oxy compound (B) is used in such an amount that the mole ratio of aluminum atoms in the component (B) to transition metal atoms (M) in the transition metal compound (A) (Al/M) will be a value ranging usually from 10 to 500,000, preferably from 50 to 100,000.

When an organic metal compound, a compound which can react with the transition metal compound (A) to form an ion pair, a carrier and an organic compound, as other optional components, are used together, the used amounts thereof are amounts described in Japanese Patent Application Laid-Open No. 11-315109.

The step 1 can be finished by the contact usually at −20 to 50° C., preferably at −10 to 25° C. for 1 to 300 minutes, preferably for 20 to 200 minutes.

In the step 2, the polymerization reaction is advanced by the contact usually at −20 to 75° C., preferably at 0 to 50° C. for 1 to 600 minutes, preferably for 5 to 180 minutes. The pressure in the step 2 is usually from a normal pressure to 100 kg/cm², preferably from a normal pressure to 50 kg/cm². The polymerization reaction can be conducted by any one of batch type, semi-continuous type, and continuous type processes. The polymerization can be conducted at two or more separated stages wherein reaction conditions are different.

The single-chain-end functionalized polyolefin of the invention can be developed into various applications. The polyolefin can be applied to, for example, a high molecular weight additive; a compatibility accelerator; a diblock copolymer useful as a compatibility accelerator or modifier for polymer; a precursor of a triblock copolymer useful as thermoplastic elastomer or the above-mentioned articles; or a surface modifier for improving paintability, adhesive property and other properties of resin. The polyolefin can be used, in the form of a macromonomer, as raw material of a polymer having a specific structure such as a comb-shaped or star-shaped structure, and applied to a viscosity adjustor for oil, or some other agents.

In the hydrolysis step of the step 3, which is an optional constituting requirement of the production process according to the invention, water or alcohol is usually used as a hydrolyzing agent, and the hydrolysis is conducted under an acidic or basic condition. The hydrolysis may be conducted in the presence of an organic solvent in a two-phase system, or conducted in a gas phase using steam. Usually, the following conditions are adopted: a temperature of 0 to 800° C. and a time of 1 minute to 24 hours.

The invention will be specifically described on the basis of examples hereinafter. However, the invention is not limited to these examples. The structures of polymers obtained in the examples were each decided by use of NMR (FT; 270 MHz: $^1H$; and 67.5 MHz: $^{13}C$), DSC, high-temperature GPC, and so on.

Example 1

Into a glass reactor having an internal volume of 500 mL and purged sufficiently with nitrogen were charged 250 mL of toluene and 15.2 mmol of methylaluminoxane, the amount being an amount in terms of aluminum atoms therein. Thereto was added a solution of 21.3 mg (0.136 mmol) of $Me_2AlO$—$(CH_2)_4CH$=$CH_2$ in toluene. Thereto was added a solution of 88.9 mg (containing diethyl ether, 0.101 mmol) of a titanium complex, bis[N-(3-t-butylsalicylidene)-2,3,4,5,6-pentafluoroanilinate]titanium dichloride in toluene, and then the components were caused to react at 27° C. for 15 minutes. Thereafter, the reaction solution was cooled to 0° C. Thereafter, a mixed gas of ethylene and nitrogen (gas flow rate: ethylene, 5 L/h; and nitrogen, 50 L/h), the pressure of which was a normal pressure, was blown from the bottom of the reactor to the inside thereof so as to cause the components to react at 0° C. for 5 minutes. Thereafter, the supply of ethylene was stopped and methanol was added thereto, thereby terminating the polymerization. After the termination of the polymerization, the reactant was poured into 600 mL of methanol containing a small amount of hydrochloric acid to precipitate the entire amount of a polymer. The polymer was collected by filtration. The polymer was dried at 80° C. under a reduced pressure for 10 hours so as to be yielded in an amount of 0.266 g. The polymerization activity per mmol of titanium was 30.9 g, the number-average molecular weight (Mn) of the polymer was 13,000, the ratio of the weight-average molecular weight (Mn) to the number-average molecular weight (Mn), (Mw/Mn), was 1.08, and the melting peak temperature based on DSC was 133.8° C. In the $^1H$ NMR spectrum (FT, 270 MHz, in $C_2D_2Cl_4$, at 120° C.) of this polymer, a triplet corresponding to a methylene group adjacent to an OH group made its appearance near 3.64 ppm, and an overlap of methyl groups of two types at terminals made its appearance near 0.95 ppm. The integration ratio therebetween was 2:6. In the $^{13}C$ NMR spectrum (FT, 67.5 MHz, in $C_2D_2Cl_4$, at 120° C.), the methyl groups made their appearance at 13.9 ppm and 19.7 ppm, and a signal corresponding to the methylene group adjacent to the OH group made its appearance at 62.9 ppm. From the above, a structure of a polymer of the following formula was identified:

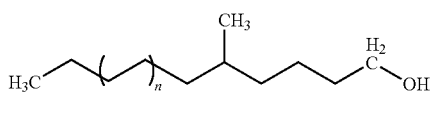

Example 2

Into a glass reactor having an internal volume of 500 mL and purged sufficiently with nitrogen were charged 250 mL of toluene and 10.0 mmol of methylaluminoxane, the amount being an amount in terms of aluminum atoms therein. The reaction solution was cooled to 0° C., and then thereto was added a solution of 10.7 mg (0.0685 mmol) of $Me_2AlO$—$(CH_2)_4CH$=$CH_2$ in toluene. Thereto was added a solution of 58.4 mg (containing the weight of diethyl ether, 0.0666 mmol) of a titanium complex, bis[N-(3-t-butylsalicylidene)-2,3,4,5,6-pentafluoroanilinate]titanium dichloride in toluene, and then the components were caused to react at 0° C. for 30 minutes. Thereafter, propylene (gas flow rate: 100 L/h), the pressure of which was a normal pressure, was blown from the bottom of the reactor to the inside thereof so as to cause the components to react at 0° C. for 105 minutes. Thereafter, the supply of propylene was stopped, and methanol was added thereto, thereby terminating the polymerization. After the termination of the polymerization, the reactant was poured into 600 mL of methanol containing a small amount of hydrochloric acid to precipitate the entire amount of a polymer. The polymer was collected by filtration. The polymer was dried at 80° C. under a reduced pressure for 10 hours so as to be yielded in an amount of 0.354 g. The polymerization activity per mmol of titanium was 3.04 g, the number-average molecular weight (Mn) of the polymer was 8,820, the ratio of the weight-average molecular weight (Mw) to the number-average molecular weight (Mn), (Mw/Mn), was 1.05, and the melting peak temperature based on DSC was 144.4° C. In the $^1H$ NMR spectrum (FT, 270 MHz, in $C_2D_2Cl_4$, at 120° C.) of this polymer, a triplet corresponding to a methylene group adjacent to an OH group made its appearance near 3.64 ppm. In the $^{13}C$ NMR spectrum (FT, 67.5 MHz, in $C_2D_2Cl_4$, at 120° C.), a signal corresponding to the methylene group adjacent to the OH group made its appearance at 62.9 ppm. Peaks at 22.5-24.0 ppm corresponding to isopentyl and isobutyl groups, which were unreacted initiating ends, hardly made their appearance.

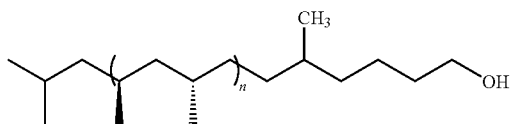

Example 3

Propylene was polymerized under the same conditions as in Example 2 except that $Me_2AlO$—$(CH_2)_9CH$=$CH_2$ was used instead of $Me_2AlO$—$(CH_2)_4CH$=$CH_2$. The polymerization activity per mmol of titanium was 3.03 g, the number-average molecular weight (Mn) of the polymer was 8,200, and the ratio of the weight-average molecular weight (Mw) to the number-average molecular weight (Mn), (Mw/Mn), was 1.09. In the $^1H$ NMR spectrum (FT, 270 MHz in $C_2D_2Cl_4$, at 120° C.) of this polymer, a triplet corresponding to a methylene group adjacent to an OH group made its appearance near 3.64 ppm.

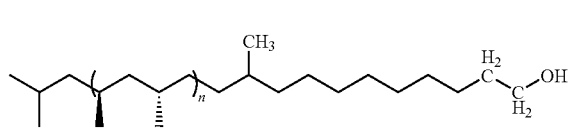

Example 4

Propylene was polymerized under the same conditions as in Example 2 except that $Me_3SiO$—$(CH_2)_9CH$=$CH_2$ was used instead of $Me_2AlO$—$(CH_2)_4CH$=$CH_2$. The polymerization activity per mmol of titanium was 2.88 g, the number-average molecular weight (Mn) of the polymer was 7,700, the ratio of the weight-average molecular weight (Mw) to the number-average molecular weight (Mn), (Mw/Mn), was 1.06, the weight-average molecular weight (Mw) of the polymer was 9,250, the ratio of the weight-average molecular weight to the number-average molecular weight (Mn) was 1.06, and the melting peak temperature based on DSC was 142.0° C. In the $^1H$ NMR spectrum (FT, 270 MHz, in $C_2D_2Cl_4$, at 120° C.) of this polymer, a triplet corresponding to a methylene group adjacent to an OH group made its appearance near 3.64 ppm.

Example 5

Into a glass reactor having an internal volume of 500 mL and purged sufficiently with nitrogen were charged 250 mL of toluene and 4.82 mmol of methylaluminoxane, the amount being an amount in terms of aluminum atoms therein. Thereto was added a solution of 15.5 mg (0.0532 mmol) of $(Me_3Si)_2$N-m-$C_6H_4$—$(CH_2)_2CH$=$CH_2$ in toluene. Thereto was added a solution of 42.3 mg (containing diethyl ether, 0.0482 mmol) of a titanium complex, bis[N-(3-t-butylsalicylidene)-2,3,4,5,6-pentafluoroanilinate]titanium dichloride in toluene, and then the components were caused to react at 0° C. for 120 minutes. Thereafter, a mixed gas of ethylene and nitrogen (gas flow rate: ethylene, 5 L/h; and nitrogen, 50 L/h), the pressure of which was a normal pressure, was blown from the bottom of the reactor to the inside thereof so as to cause the components to react at 0° C. for 3.5 minutes. Thereafter, the supply of ethylene was stopped and methanol was added thereto, thereby terminating the polymerization. After the termination of the polymerization, the reactant was poured into 600 mL of methanol containing a small amount of hydrochloric acid to precipitate the entire amount of a polymer. The polymer was collected by filtration. The polymer was dried at 80° C. under a reduced pressure for 10 hours so as to be yielded in an amount of 0.148 g. The polymerization activity per mmol of titanium was 52.5 g, the number-average molecular weight (Mn) of the polymer was 13,700, and the ratio of the weight-average molecular weight (Mw) to the number-average molecular weight (Mn), (Mw/Mn), was 1.15. In the $^1$H NMR spectrum (FT, 270 MHz, in $C_2D_2Cl_4$, at 120° C.) of this polymer, a triplet corresponding to a methylene group adjacent to a phenyl group, aromatic protons, and an overlap of methyl groups of two types at terminals made their appearance near 2.53 ppm, 6.45-6.65 ppm and 7-7.13 ppm, at an integration ratio of 2:4:6. From the above, a structure of a polymer of the following formula was identified:

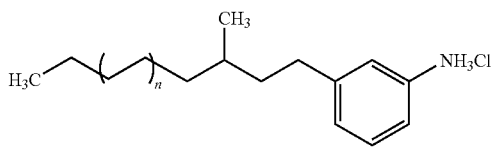

Example 6

Into a glass reactor having an internal volume of 500 mL and purged sufficiently with nitrogen were charged 250 mL of toluene and 6.48 mmol of methylaluminoxane, the amount being an amount in terms of aluminum atoms therein. Thereto was added a solution of 21.0 mg (0.0669 mmol) of $(Me_3Si)_2$N—$(CH_2)_9CH=CH_2$ in toluene. Thereto was added a solution of 56.8 mg (containing diethyl ether, 0.0647 mmol) of a titanium complex, bis[N-(3-t-butylsalicylidene)-2,3,4,5,6-pentafluoroanilinate]titanium dichloride in toluene, and then the components were caused to react at 0° C. for 150 minutes. Thereafter, a mixed gas of ethylene and nitrogen (gas flow rate: ethylene, 5 L/h; and nitrogen, 50 L/h), the pressure of which was a normal pressure, was blown from the bottom of the reactor to the inside thereof so as to cause the components to react at 0° C. for 3 minutes. Thereafter, the supply of ethylene was stopped and methanol was added thereto, thereby terminating the polymerization. After the termination of the polymerization, the reactant was poured into 600 mL of methanol containing a small amount of hydrochloric acid to precipitate the entire amount of a polymer. The polymer was collected by filtration. The polymer was dried at 80° C. under a reduced pressure for 10 hours so as to be yielded in an amount of 0.143 g. The polymerization activity per mmol of titanium was 44.1 g, the number-average molecular weight (Mn) of the polymer was 15,500, and the ratio of the weight-average molecular weight (Mw) to the number-average molecular weight (Mn), (Mw/Mn), was 1.10. In the $^1$H NMR spectrum (FT, 270 MHz, in $C_2D_2Cl_4$, at 120° C.) of this polymer, a triplet corresponding to a methylene group adjacent to a $NH_3Cl$ group, a multiplet corresponding to a methylene group adjacent thereto, and an overlap of methyl groups of two types at terminals made their appearance near 3 ppm, 1.80 ppm and 0.95 ppm, at an integration ratio of 2:2:6. From the above, a structure of a polymer of the following formula was identified:

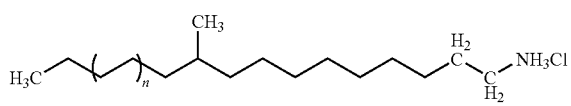

Comparative Example 1

Propylene was polymerized under the same conditions as in Example 2 except that $Me_2AlO$-$(454644CH_2)_4CH=CH_2$ was not added. The polymerization activity per mmol of titanium was 3.16 g, and the melting peak temperature based on DSC was 146.0° C. In the $^1$H NMR spectrum (FT, 270 MHz, in $C_2D_2Cl_4$, at 120° C.) of this polymer, no peak made its appearance near 3.64 ppm. In the $^{13}$CNMR spectrum (FT, 67.5 MHz, in $C_2D_2Cl_4$, at 120° C.), peaks at 22.5-24.0 ppm corresponding to isopentyl and isobutyl groups at the terminals made their appearance.

INDUSTRIAL APPLICABILITY

The polyolefin having a polar functional group at its single terminal position itself, or the polyolefin subjected to a further modifying treatment is useful for various purposes.

The invention claimed is:

1. A process of producing a single-chain-end functionalized polyolefin, comprising performing step 1, followed by step 2 in the presence of an olefin polymerizing catalyst comprising a compound (A), which comprises a transition metal in groups IV to V to form the single-chain-end functionized polyolefin of formula (I);

wherein step 1 comprises contacting compound (A) with a polar-group-containing olefin (C) represented by the following general formula (II):

CHA=C(R)-Q-Y'     (II)

wherein Y' comprises at least one element selected from the group consisting of oxygen, sulfur, nitrogen, phosphorus and halogen, Q is an alkylene group which may have a substituent, a carbonyl group, or bivalent oxygen, A and R each represent a hydrogen atom or a hydrocarbon group which may have a substituent, and A or R may be bonded together to Q to form a ring, wherein step 2 comprises contacting the product of step 1 with at least one olefin (D) selected from the group consisting of ethylene and olefins having 3 to 20 carbon atoms n times, wherein n is an integer of 1 or more, so as to mix them, provided that when n is an integer of 2 or more, the olefins (D) used in the respective contact operations are different in kind or composition, wherein said single-chain-end functionalized polyolefin is represented by the following formula (I):

P—X     (I)

wherein X comprises at least one element selected from the group consisting of oxygen, sulfur, nitrogen, phosphorus and halogen, P represents a polymer chain selected from the group consisting of ethylene and olefins having 3 to 20 carbon atoms, and X is bonded to a terminal of P.

2. The process of producing a single-chain-end functionalized polyolefin according to claim 1, wherein the process further comprises step 3, in which the group Y' is converted to another group.

3. The process of producing a single-chain-end functionalized polyolefin according to claim 2, wherein the group Y' is converted to another group by reaction of hydrolysis, oxidation, reduction or nucleophilic substitution.

* * * * *